US006608475B2

(12) United States Patent
Gumm

(10) Patent No.: US 6,608,475 B2
(45) Date of Patent: Aug. 19, 2003

(54) NETWORK ANALYZER USING TIME SEQUENCED MEASUREMENTS

(75) Inventor: Linley F. Gumm, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/938,704

(22) Filed: Aug. 23, 2001

(65) Prior Publication Data

US 2003/0038618 A1 Feb. 27, 2003

(51) Int. Cl.[7] .............................................. G01R 23/12
(52) U.S. Cl. ................................................. 324/76.53
(58) Field of Search .............................. 455/226.1, 230, 455/319; 702/76; 324/76.12, 76.22, 76.39, 76.53

(56) References Cited

U.S. PATENT DOCUMENTS 5,307,284 A * 4/1994 Brunfeldt et al. ........... 364/485
5,642,039 A * 6/1997 Bradley et al. .......... 324/76.53

* cited by examiner

Primary Examiner—Safet Metjahic
Assistant Examiner—Etienne P LeRoux
(74) Attorney, Agent, or Firm—Frances I. Gray

(57) ABSTRACT

A network analyzer using time sequenced measurements has a pair of switches for isolating respective mixers from a local oscillator source to ease problems caused by direct leakage from the signal source. The signal source is set to a desired measurement frequency and a local oscillator is set to a desired frequency so that, when mixed, a desired IF frequency is achieved. The signal source output is applied to a return loss bridge, to which also is coupled a device under test, and to a reference channel mixer. A return loss signal from the return loss bridge is applied to a test channel mixer. The LO output is applied in a time sequence via an LO switch first to the reference channel mixer and then to the test channel mixer. An output switch couples the respective mixers to a processor in the same time sequence to provide sequential measurements of magnitude and phase from which reflection coefficients are derived for the device under test. Likewise gain/loss measurements may be made by coupling the device under test between the impedance test port and a transmission test port, the transmission test port also being coupled to a transmission channel mixer to which also is input the LO output via the LO switch in the time sequence. The output of the transmission channel mixer is coupled via the output switch to the processor to obtain the gain/loss measurements.

7 Claims, 2 Drawing Sheets

NETWORK ANALYZER USING TIME SEQUENCED MEASUREMENTS

BACKGROUND OF THE INVENTION

The present invention relates to network analysis, and more particularly to a network analyzer that uses time sequenced measurements to make RF measurements.

In all network analyzers two RF measurements are required to determine the magnitude and phase of a reflection coefficient. As shown in FIG. 1, which corresponds to FIG. 7 in U.S. Pat. No. 5,642,039 (Bradley et al), a sample of the signal that is applied to a return loss bridge is used to establish its magnitude and phase. It is called the reference signal. Also a return or test signal output from the return loss bridge is measured to determine this signal's magnitude and phase. It is called the test signal. The reflection coefficient of the device under test is then determined as the ratio of the test signal rationated or divided by the reference signal. In this way the arbitrary amplitude and phase of the signal source is removed from the measurement results. Bradley et al teach that the two measurements are made simultaneously.

An advantage of making the measurements simultaneously is that it makes the effects of phase noise in the measurements much smaller. The disadvantage is that the effects of small leakage signals traveling between the two measurement processes due to imperfect shielding or imperfect circuit elements may cause measurement error in one or both of the measurements. The direct leakage problem is driven by two issues: (1) lack of appropriate shielding; and (2) leakage of source signal from the mixer input to its local oscillator terminals, backward along the local oscillator path to a common point with the transmission mixer local oscillator signal and hence forward to the transmission mixer along its local oscillator path.

What is desired is a network analyzer that determines RF measurements for a device under test while minimizing signal source leakage impact upon the measurements.

BRIEF SUMMARY OF THE INVENTION

Accordingly the present invention provides a network analyzer using time sequenced measurements that isolates respective channel mixers from a signal source to ease problems caused by direct leakage from a signal source. The signal source is set to a desired measurement frequency and a local oscillator is set to a desired frequency so that, when mixed, a desired IF frequency is achieved. The signal source output is applied to an impedance test terminal, to which also is coupled a device under test, and to a reference channel mixer. A return loss signal from the impedance test terminal is applied to a test channel mixer. The LO output signal is applied in a time sequence in any order via an LO switch first to one channel mixer and then to the other channel mixer. An output switch couples the respective mixers to a processor in the same time sequence to provide sequential measurements of magnitude and phase for each channel from which reflection coefficients are derived for the device under test. Likewise gain/loss measurements may be made by coupling the device under test between the impedance test port and a transmission test port, the transmission test port being coupled to a transmission channel mixer to which also is input the LO output via the LO switch in the time sequence. The output of the transmission channel mixer is coupled via the output switch to the processor to obtain the gain/loss measurements.

The objects, advantages and other novel features of the present invention are apparent from the following detailed description when read in conjunction with the appended claims and attached drawing.

DETAILED DESCRIPTION OF THE INVENTION

Figure 2:
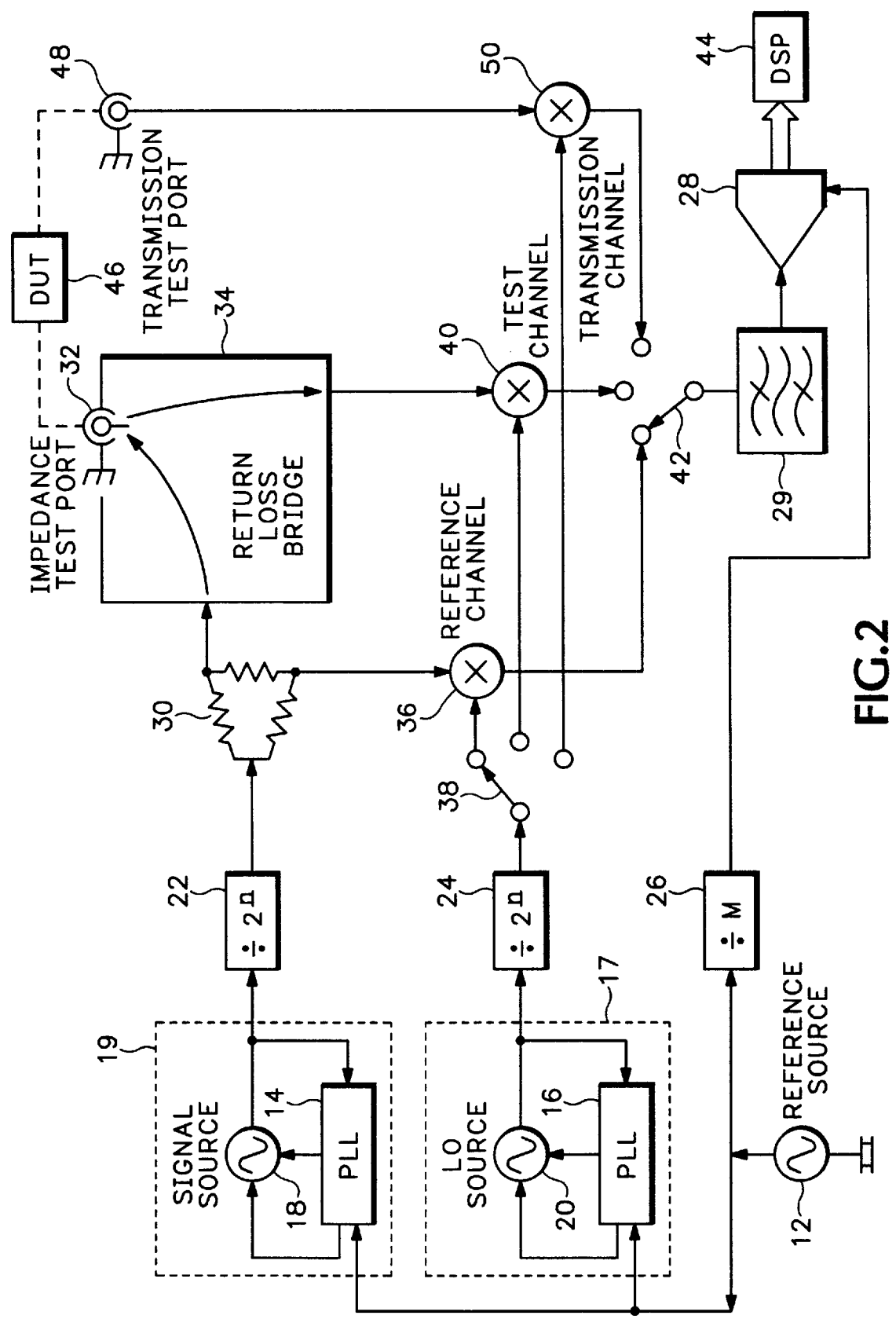
FIG. 2 is a block diagram view of a network analyzer using time sequenced measurements according to the present invention.

Referring now to FIG. 2 a reference source 12 is applied to both a signal source phase locked loop (PLL) 14 and to a local oscillator (LO) PLL 16. The respective PLLs 14, 16 control respective oscillators 18, 20. The oscillator-PLL combinations form respective synthesizers 17, 19. The synthesizer outputs are input to respective variable divide-by-two counters 22, 24. The tuning range of the oscillators 18, 20 is 2:1 in frequency. When the respective output signals are applied to the divide-by-two counters 22, 24, the result is a synthesizer with a very wide, continuous tuning frequency range. The reference source 12 also is applied to a divide-by-M counter 26 that provides a sample clock to an analog-to-digital converter (ADC) 28. The signal source output from the variable divide-by-two counter 22 is applied via a splitter 30 to the input of a return loss bridge 34. The signal source output from the splitter 30 is also applied to a reference channel mixer 36. The LO output from the variable divide-by-two counter 24 is also applied to the reference channel mixer 36 via an LO switch 38. A return loss signal from the impedance test port 32 is applied to a test channel mixer 40 together with the LO output via the LO switch 38. The respective desired intermediate frequency (IF) outputs of the reference and test channel mixers 36, 40 pass through a bandpass filter 29 and are applied to the input of the ADC 28 via an output switch 42. The output from the ADC 28 is applied to a digital signal processor 44 for analysis and display.

In operation the LO signal is routed via the LO switch 38 to the respective mixers 36, 40 sequentially, and the respective IF signals are also measured sequentially via the output switch 42. To make a measurement the signal source 19 is set to the desired test frequency by selecting the correct PLL frequency followed by selecting the correct variable for the variable divide-by-two counter 22. The LO frequency source 17 is set to a frequency removed from the signal source frequency by the desired IF frequency by selecting the correct PLL frequency followed by selecting the corresponding variable for the variable divide-by-two counter 24. The frequency is chosen to be a sub-multiple of the sample clock frequency from the divide-by-M counter 26 in such a way that there is an exact, integer number of samples per cycle of the IF signals from the mixers 36, 40. To minimize processing difficulty a typical arrangement is for the IF frequency to be exactly four ADC samples per IF cycle. Other IF frequencies may be readily accommodated. The LO switch 38 applies the LO signal the reference channel mixer 36 while the output switch 42 couples the IF signal from the reference channel mixer to the input of the ADC 28. A sufficiently long record of data is processed by the DSP 44 to obtain the magnitude and relative phase of he IF signal to a desired precision. Without changing any PLL settings for the signal source or LO, the LO switch 38 is then set to connect the LO signal to the text channel mixer 40 while the output switch 42 couples the IF signal from the test channel mixer to the ADO 28. Again the magnitude and phase of the IF signal is determined as above. Care is taken to make sure the two measurement are coherent with each other by keeping track of the number of ADC samples from the start of the reference channel measurement. Otherwise the phase measurements would be meaningless. The sample chosen as the beginning of the test channel measurement must yield a zero remainder when its sample number is divided by the umber of samples per cycle of the IF signal. Once the magnitude and phase of the reference and test channel signals have been determined, the value of the reflection coefficient's magnitude and phase is then established by dividing the test channel's magnitude by the reference channel's magnitude. The phase is established by subtracting the reference channel's phase from that of the test channel. The measurement sequence is immaterial—the test port may be measured first without affecting the measurement results.

The advantages of this sequential measurement approach becomes more evident when the remaining portion of FIG. 2 is examined which includes transmission testing. Here a device under test (DUT) 46 is coupled between the impedance test port 32 and a transmission test port 48. The transmitted signal from the DUT 46 is input to a transmission channel mixer 50, to which also is input the LO signal from LO switch 38. With the same setup for the signal source and LO as described above the LO signal is applied sequentially via the LO switch 38 to the transmission channel mixer 50, and the resulting IF signal is applied to the ADC 28 via the output switch 42 for processing by the DSP 44 to obtain gain and loss measurements.

Figure 1:
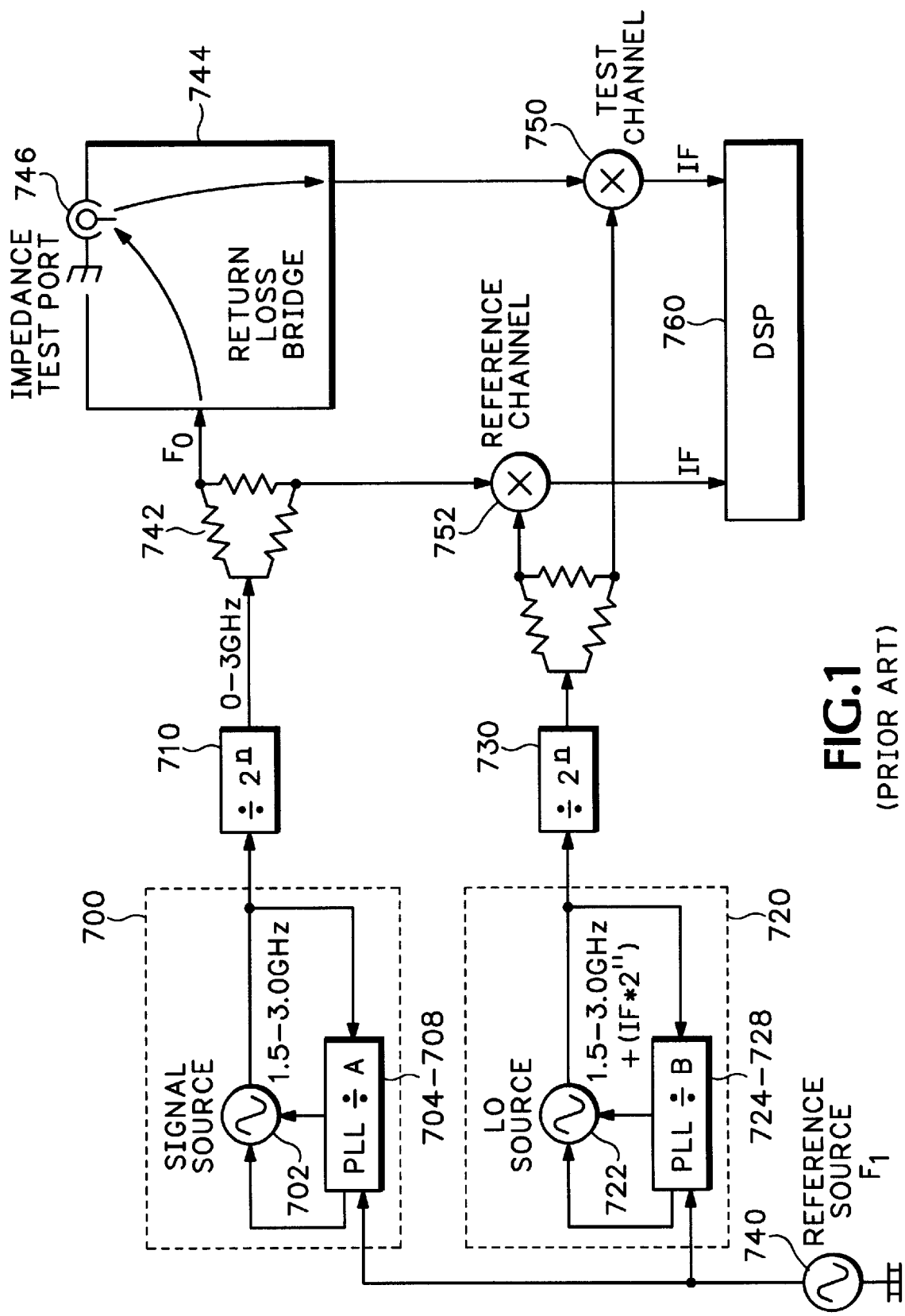
FIG. 1 is a block diagram view of a prior art network analyzer using simultaneous measurements.

The problem with gain and loss measurements is that a user often wishes to measure extreme values of loss, perhaps 90 dB, 100 dB or more. With the prior art device shown in FIG. 1 in order to handle such dynamic range, extreme care needs to be taken to avoid low amplitude signal source leakage signals from causing measurement errors. By eliminating the LO signal to the unused mixers via the LO switch 38, thus shutting down any unwanted frequency conversion process, the direct leakage from the signal source problem is eased, achieving sufficient IF signal isolation to make high dynamic range measurement possible. Further, to minimize low level leakage of the source signal into the measurement channel, the switches 38, 42 are more economical and consume less power than alternative circuitry that achieves sufficient isolation. With improvements in synthesizer technology minimizing phase noise, this time sequenced approach allows both reflection coefficient measurements and gain/loss measurements to be performed with desired accuracy with less expensive circuitry and less shielding.

Thus the present invention provides a network analyzer using time sequenced measurements to obtain both reflection coefficient measurements (magnitude and phase measurements) and gain/loss measurements for a device under test by isolating signal source leakage from the measurements.

What is claimed is:

1. A network analyzer of the type having a variable frequency signal source applied to a return loss bridge and a reference channel mixer, the reference channel mixer having a variable local oscillator signal input so that the output of the reference channel mixer is at a desired IF frequency, having a test channel mixer coupled to receive a return loss signal from the return loss bridge and the variable local oscillator signal so that the output of the test channel mixer is at the desired IF frequency, and having means for processing the IF frequencies from the reference and test channel mixers to obtain RF measurements for a device under test coupled to the impedance test port further comprising:

a first switch coupled to apply the variable local oscillator signal sequentially to the reference and test channel mixers; and a second switch coupled to apply the IF frequencies from the outputs of the reference and test channel mixers sequentially to the processing means.

2. The network analyzer of claim 1 further comprising:

a transmission test port; and a transmission channel mixer coupled to receive at a first input a signal from the transmission test port and to receive at a second input the variable local oscillator signal via the first switch sequentially and having an output coupled via the second switch sequentially to the processing means for making gain/loss measurements for the device under test when the device under test is coupled between the impedance test port and the transmission test port.

3. A method of making RF measurements for a device under test comprising the steps of:

coupling a source signal to an input of a device under test via a return loss bridge and to a first mixer;

coupling a return loss signal from the input of the device under test via the return loss bridge to a second mixer;

sequentially measuring magnitude and phase for an IF signal output from each mixer; and determining reflection coefficients for the device under test from the respective magnitude and phase measurements.

4. The method as recited in claim 3 wherein the sequentially measuring step comprises the steps of:

applying a local oscillator signal to the first mixer for a specified time;

measuring the magnitude and phase of the IF signal output from the first mixer;

subsequently applying the local oscillator to the second mixer for the specified time; and measuring the magnitude and phase of the IF signal output from the second mixer.

5. The method as recited in claim 3 further comprising the steps of:

coupling a third mixer to an output of the device under test;

measuring magnitude and phase for the IF signal output from the third mixer; and from the magnitude and phase measurements for the first and third mixers determining gain/loss measurements for the device under test.

6. A method of making RF measurements for a device under test comprising the steps of:

coupling a source signal to an input of a device under test via a return loss bridge and to a first mixer;

coupling an output of the device under test via the return loss bridge to a second mixer;

sequentially measuring magnitude and phase for an IF signal output from each mixer; and determining gain/loss measurements for the device under test from the respective magnitude and phase measurements.

7. The method as recited in claim 6 wherein the sequentially measuring step comprises the steps of:

applying a local oscillator signal to the first mixer for a specified time;

measuring the magnitude and phase of the IF signal output from the first mixer;

subsequently applying the local oscillator to the second mixer for the specified time; and measuring the magnitude and phase of the IF signal output from the second mixer.

* * * * *